(12) United States Patent
Hobbs et al.

(10) Patent No.: US 11,785,572 B2
(45) Date of Patent: Oct. 10, 2023

(54) REMINDERS BASED ON DEVICE PROXIMITY USING BLUETOOTH LE

(71) Applicant: GOOGLE LLC, Mountain View, CA (US)

(72) Inventors: Nicholas Kenneth Hobbs, San Francisco, CA (US); Randall Cole Luecke, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 10 days.

(21) Appl. No.: 17/979,440

(22) Filed: Nov. 2, 2022

(65) Prior Publication Data
US 2023/0048123 A1 Feb. 16, 2023

Related U.S. Application Data

(63) Continuation of application No. 16/933,020, filed on Jul. 20, 2020, now Pat. No. 11,496,984, which is a continuation of application No. 15/893,773, filed on
(Continued)

(51) Int. Cl.
| | |
|---|---|
| H04W 24/00 | (2009.01) |
| H04W 64/00 | (2009.01) |
| G06F 15/16 | (2006.01) |
| G08B 1/08 | (2006.01) |
| H04W 4/21 | (2018.01) |
| H04W 4/80 | (2018.01) |
| G06Q 10/10 | (2023.01) |
| H04W 8/00 | (2009.01) |
| G06Q 30/02 | (2023.01) |
| G06Q 10/109 | (2023.01) |
| G06Q 30/0251 | (2023.01) |

(52) U.S. Cl.
CPC ............ *H04W 64/00* (2013.01); *G06Q 10/109* (2013.01); *G06Q 30/0255* (2013.01); *H04W 4/21* (2018.02); *H04W 4/80* (2018.02); *H04W 8/005* (2013.01)

(58) Field of Classification Search
None
See application file for complete search history.

(56) References Cited

U.S. PATENT DOCUMENTS

| | | | | |
|---|---|---|---|---|
| 6,850,837 | B2* | 2/2005 | Paulauskas et al. | G01C 21/3614 |
| | | | | 701/428 |
| 7,039,420 | B2* | 5/2006 | Koskinen et al. | ........ H04W 4/02 |
| | | | | 455/456.2 |

(Continued)

FOREIGN PATENT DOCUMENTS

| | | |
|---|---|---|
| CN | 101940055 A | 1/2011 |
| DE | 102008037021 A1 | 2/2010 |

(Continued)

OTHER PUBLICATIONS

Christian Zibreg, "iOS 7 simplifies file sharing with AirDrop", retrieved from http://www.idownloadblog.com/2013/06/10ios-7-airdrop/, Jun. 10, 2013, 2 pages, dated Jun. 2013.
(Continued)

*Primary Examiner* — Tuan A Tran
(74) *Attorney, Agent, or Firm* — Gray Ice Higdon

(57) ABSTRACT

In one general aspect, a method can include identifying, by a computing device, a geographic proximity of an entity, establishing, by the computing device, direct short-range communications with the entity, the computing device and the entity being able to communicate with one another using a short-range communication protocol. The method can further include receiving, by the computing device, an indication that the computing device shares an identifier with the entity, and receiving, by the computing device, information relevant to the computing device regarding the entity based on the shared identifier.

19 Claims, 10 Drawing Sheets

Related U.S. Application Data

(63) Feb. 12, 2018, now Pat. No. 10,721,706, which is a continuation of application No. 14/166,335, filed on Jan. 28, 2014, now Pat. No. 9,894,633.

(60) Provisional application No. 61/912,703, filed on Dec. 6, 2013.

(56) References Cited

U.S. PATENT DOCUMENTS

| | | | |
|---|---|---|---|
| 7,212,827 B1* | 5/2007 | Veschl | H04W 68/00 455/456.6 |
| 8,032,126 B2* | 10/2011 | Fraccaroli | H04W 4/02 455/445 |
| 8,054,180 B1* | 11/2011 | Scofield et al. | H04W 4/029 340/539.11 |
| 8,243,897 B2* | 8/2012 | Groth | G06Q 10/109 455/414.1 |
| 8,285,206 B2* | 10/2012 | Martin et al. | H04M 1/72412 715/751 |
| 8,380,804 B2* | 2/2013 | Jain et al. | G06Q 10/109 709/207 |
| 8,537,003 B2* | 9/2013 | Khachaturov et al. | G08B 21/24 340/309.7 |
| 8,571,598 B2 | 10/2013 | Valavi | |
| 8,768,254 B2* | 7/2014 | Martin et al. | H04M 1/72412 455/456.3 |
| 8,868,762 B1* | 10/2014 | Mishra et al. | G06F 16/9537 709/227 |
| 8,930,966 B2* | 1/2015 | Ranjan et al. | G08B 5/36 719/318 |
| 9,213,963 B2* | 12/2015 | Jain et al. | G06Q 10/109 |
| 9,247,387 B2* | 1/2016 | Bonanni et al. | H04W 4/023 |
| 9,307,033 B1* | 4/2016 | Meschkat | H04L 51/222 |
| 9,894,633 B2 | 2/2018 | Hobbs et al. | |
| 10,721,706 B2 | 7/2020 | Hobbs et al. | |
| 2005/0273493 A1 | 12/2005 | Buford et al. | |
| 2006/0085419 A1 | 4/2006 | Rosen | |
| 2006/0288347 A1 | 12/2006 | Jemiolo et al. | |
| 2007/0167136 A1 | 7/2007 | Groth | |
| 2008/0301567 A1 | 12/2008 | Martin et al. | |
| 2008/0302867 A1 | 12/2008 | Holberg | |
| 2009/0131079 A1 | 5/2009 | Sekhar | |
| 2010/0295676 A1 | 11/2010 | Khachaturov et al. | |
| 2011/0282750 A1 | 11/2011 | Rosen | |
| 2012/0088524 A1* | 4/2012 | Moldavsky et al. | H04W 4/023 455/456.3 |
| 2012/0271883 A1 | 10/2012 | Montoya et al. | |
| 2013/0065584 A1 | 3/2013 | Lyon et al. | |
| 2013/0106684 A1 | 5/2013 | Weast et al. | |
| 2013/0161381 A1 | 6/2013 | Roundtree et al. | |
| 2013/0203445 A1 | 8/2013 | Grainger et al. | |
| 2013/0210461 A1 | 8/2013 | Moldavsky et al. | |
| 2013/0331127 A1* | 12/2013 | Sabatelli et al. | H04W 4/80 455/456.3 |
| 2014/0067958 A1 | 3/2014 | Bradley et al. | |
| 2014/0135036 A1* | 5/2014 | Bonanni et al. | H04W 4/023 455/456.3 |
| 2014/0206391 A1 | 7/2014 | Perotti | |
| 2020/0351812 A1 | 11/2020 | Hobbs et al. | |

FOREIGN PATENT DOCUMENTS

| | | | | |
|---|---|---|---|---|
| EP | 2000961 | A1 | 12/2008 | |
| WO | 03056487 | A1* | 7/2003 | G06F 17/60 |
| WO | 2015085091 | A1 | 6/2015 | |

OTHER PUBLICATIONS

Adomaly: 1st Mobile Ad Network built on Apple iBeacon & Sonic Beacon Technology", retrieved on Sep. 3, 2013 from https://adomaly.com/, 6 pages, dated Sep. 2013.

AppleInsider Staff, "Bluetooth devices to gain notification support in iOS 7 & Mavericks with Apple's new APIs", Jun. 13, 2013, 6 pages.

China National Intellectual Property Administration; Notice of Allowance issued in Application No. 201480066327; 6 pages; dated Dec. 7, 2021.

China National Intellectual Property Administration; Office Action issued in Application No. 201480066327.7 dated Nov. 27, 2018.

China National Intellectual Property Administration; Second Office Action issued in Application No. 201480066327.7; 21 pages, dated May 20, 2019.

Daniel Eran Dilger, "Inside iOS 7: iBeacons enhance apps' location awareness via Bluetooth LE", AppleInsider, Jun. 19, 2013, 8 pages, dated Jun. 2013.

European Patent Office; Communication Pursuant Article 94(3) EPC issued in Application No. 14821011.5; 4 pages; dated Feb. 26, 2021.

European Patent Office; Examination Report of EP Application No. 14821011.5; 7 pages; dated Nov. 19, 2018.

European Patent Office; Intention to Grant issued in Application No. 14821011.5, 52 pages, dated Jun. 17, 2022.

Frequently Asked Questions, The Bump App for iPhone and Android, Bump Technologies, Inc., retrieved on Sep. 2, 2013 from http://bu.mp/company/faq, 7 pages, dated Sep. 2013.

Gupta, et al., "PeerSense: Who is near you?", IEEE Xplore, IEEE International Conference on Pervasive Computing and Communications Workshops, Mar. 2012, retrieved on Sep. 3, 2013, 2 pages, dated Sep. 2013.

International Preliminary Report on Patentability for PCT Patent Application No. PCT/US2014/068620, dated Jun. 16, 2016, 8 pages, dated Jun. 2016.

International Search Report and Written Opinion for PCT Patent Application No. PCT/US2014/068620, dated Mar. 5, 2015, 11 pages, dated Mar. 2015.

What is S Beam, and how do I use it?, AT&T Cell Phones, How-To Guides, Apr. 12, 2012, 5 pages, dated Apr. 2012.

Zomm Wireless Leash for Mobile Phones, Bluetooth Speakerphone, and Personal Safety Device--White, Amazon, com,, Sep. 2, 2013, 6 pages, dated Sep. 2013.

* cited by examiner

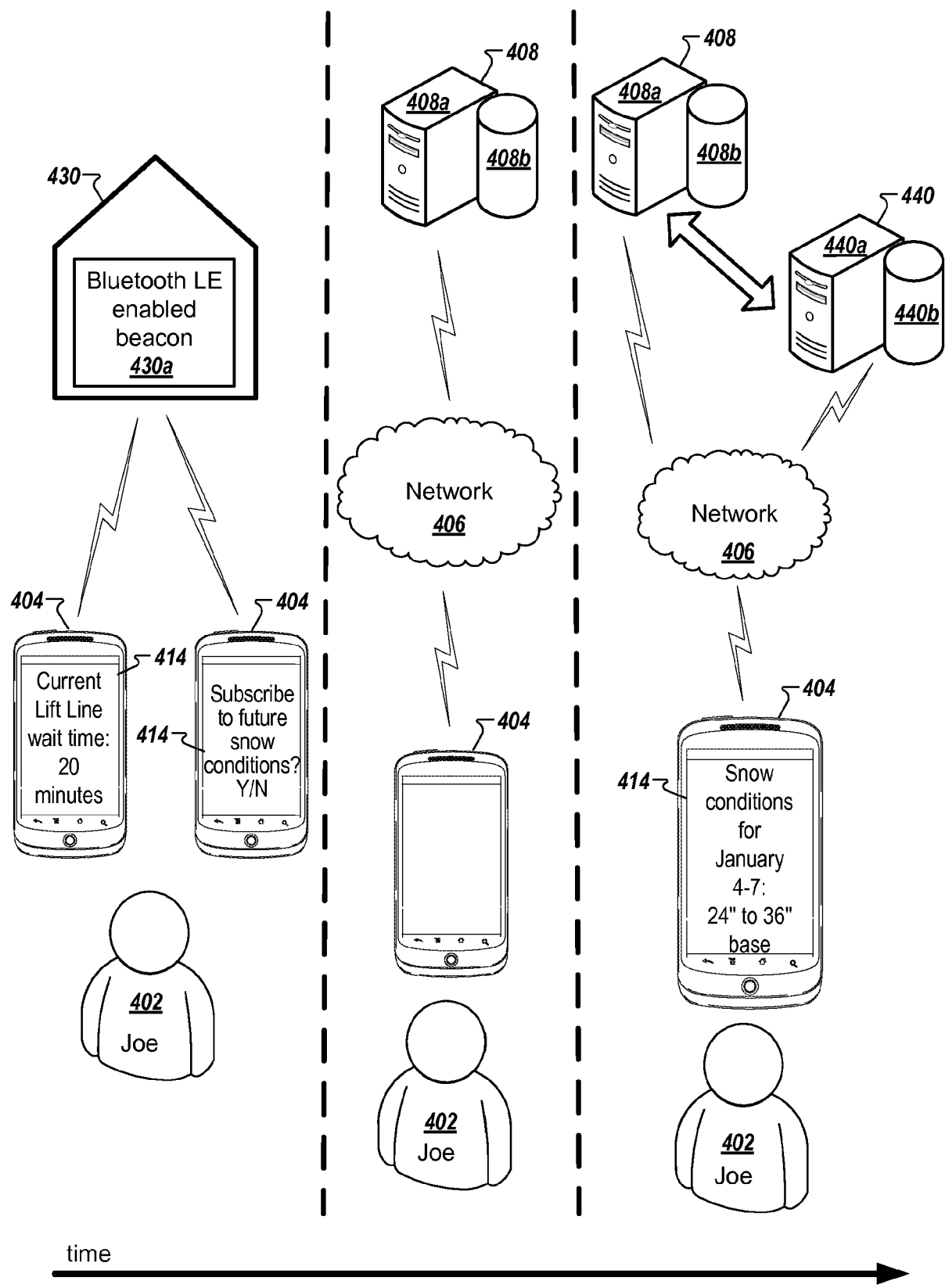

REMINDERS BASED ON DEVICE PROXIMITY USING BLUETOOTH LE

TECHNICAL FIELD

This description generally relates to computing devices. The description, in particular, relates to determining the proximity of two computing devices.

BACKGROUND

A computing device can provide contextual information to a user of the computing device. For example, a mobile computing device can provide a user with the nearest location of a coffee shop based on identifying the current location of the user (e.g., using Global Positioning System (GPS) coordinates) and based on a request by the user for a coffee shop near their current location. The mobile computing device can provide the user with the address of the identified local coffee shop. In another example, a computing device can provide a user with a reminder for a scheduled meeting based on identifying the time of day and based on a calendar entry for the meeting. The computing device can provide the user with a reminder indicator for the meeting (e.g., display a message on a display screen of the computing device and, in some cases, produce an audible prompt).

In the above examples, a computing device identifies a location of the user and a current time of day. The computing device, however, may be limited as to its ability to provide additional contextual information to the user. The additional contextual information may be based on, for example, whom the user may be with at the time, and what may be present in the proximate surroundings of the user (e.g., businesses, restaurants, shops, retail stores, transit hubs, etc.). In addition, the contextual information may not take into account any indicators or preferences the user may have that could be related to its context. The ability of the computing device to identify more specific information related to the context of the computing device of the user and to the indicators or preferences of the user can result in providing the user with more relevant contextual information for use by the user. Thus, a need exists for systems, methods, and apparatus to address the shortfalls of present technology and to provide other new and innovative features.

SUMMARY

In one general aspect, a method can include identifying, by a computing device, a geographic proximity of an entity. The method can further include establishing, by the computing device, direct short-range communications with the entity, the computing device and the entity being able to communicate with one another using a short-range communication protocol, receiving, by the computing device, an indication that the computing device shares an identifier with the entity, and receiving, by the computing device, information relevant to the computing device regarding the entity based on the shared identifier.

Example implementations may include one or more of the following features. For instance, the computing device may be a first computing device and the entity may be a second computing device. The shared identifier may be a reminder identifier associated with a reminder set in the first computing device. The short-range communication protocol may be Bluetooth low energy (Bluetooth LE). The entity may be a physical location. The shared identifier may be an identified common interest between a set of interests associated with the computing device and a set of interests associated with the entity.

In another general aspect, a method can include creating a reminder based on receiving a request, from a first computing device, to create the reminder. The method can further include notifying a second computing device of the reminder, receiving, from the second computing device, confirmation that the second computing device will allow proximity communications with the first computing device, and generating a reminder identifier associated with the reminder. The method can still further include providing to the first computing device and the second computing device the reminder identifier in order for the second computing device to broadcast the reminder identifier using a short-range communication protocol, and in order for the first computing device to recognize the broadcasted reminder identifier from the second computing device when direct short-range communications have been established between the first computing device and the second computing device.

Example implementations may include one or more of the following features. For instance, the received request from the first computing device may include information that identifies the second computing device. The short-range communication protocol may be Bluetooth low energy (Bluetooth LE). The first computing device may recognize the broadcasted reminder identifier sent from the second computing device and, based on the recognition, may perform an action on the first computing device.

In another general aspect, a non-transitory, machine-readable medium has instructions stored thereon that, when the instructions are executed by a processor, can cause a computing device to create a reminder based on receiving a request, from a first computing device, to create the reminder, notify a second computing device of the reminder, receive, from the second computing device, confirmation that the second computing device will allow proximity communications with the first computing device, generate a reminder identifier associated with the reminder, and provide to the first computing device and the second computing device the reminder identifier in order for the second computing device to broadcast the reminder identifier using a short-range communication protocol, and for the first computing device to recognize the broadcasted reminder identifier from the second computing device when direct short-range communications have been established between the first computing device and the second computing device.

Example implementations may include one or more of the following features. The received request from the first computing device may include information that identifies the second computing device. The short-range communication protocol may be Bluetooth low energy (Bluetooth LE). The first computing device may recognize the broadcasted reminder identifier from the second computing device and, based on the recognition, may perform an action on the first computing device.

In yet another general aspect, a non-transitory, machine-readable medium has instructions stored thereon that, when the instructions are executed by a processor, can cause a computing device to identify a geographic proximity of an entity, establish direct short-range communications with an entity, the computing device and the entity being able to communicate with one another using a short-range communication protocol, receive an indication that the computing device shares an identifier with the entity, and receive information relevant to the computing device regarding the entity based on the shared identifier.

Example implementations may include one or more of the following features. For instance, the computing device may be a first computing device and the entity may be a second computing device. The shared identifier may be a reminder identifier associated with a reminder set by the first computing device. The short-range communication protocol may be Bluetooth low energy (Bluetooth LE). The entity may be a physical location. The shared identifier may be an identified common interest between a set of interests associated with the computing device and a set of interests associated with the entity.

The details of one or more implementations are set forth in the accompanying drawings and the description below. Other features will be apparent from the description and drawings, and from the claims.

BRIEF DESCRIPTION OF THE DRAWINGS

FIG. 4A, FIG. 4B, and FIG. 4C are diagrams illustrating an example implementation of the use of past proximity data of a computing device when providing future relevant information to the computing device.

Like reference symbols in the various drawings indicate like elements.

DETAILED DESCRIPTION

A computing device can include information related to and about a user of the device, such as a contacts list, a calendar, reminders, notes, etc. The user can install and use various applications that provide information to the user (e.g., a movie listings application, a map application), enjoyment to the user (e.g., a music application), or allow the user to interact with other users (e.g., social networking applications). In addition, the computing device can provide a user with contextual information that may be based on, for example, the physical location of the user and the time of day when the user is at the location.

In addition, the contextual information can be further "fine-tuned" or customized for the user providing them with a more satisfying experience. The computing device can consider other contextual factors such as the identity of the users of computing devices determined to be proximate to the computing device of the user and the proximity of buildings, business, stores, venues, restaurants, hotels, and other physical locations to the computing device of the user. The computing device of the user can use the proximity information along with the information related to and about the user of the computing device to provide a customized experience to the user by delivering to the user relevant information that is important to the user within the current context of the computing device of the user.

Figure 1:
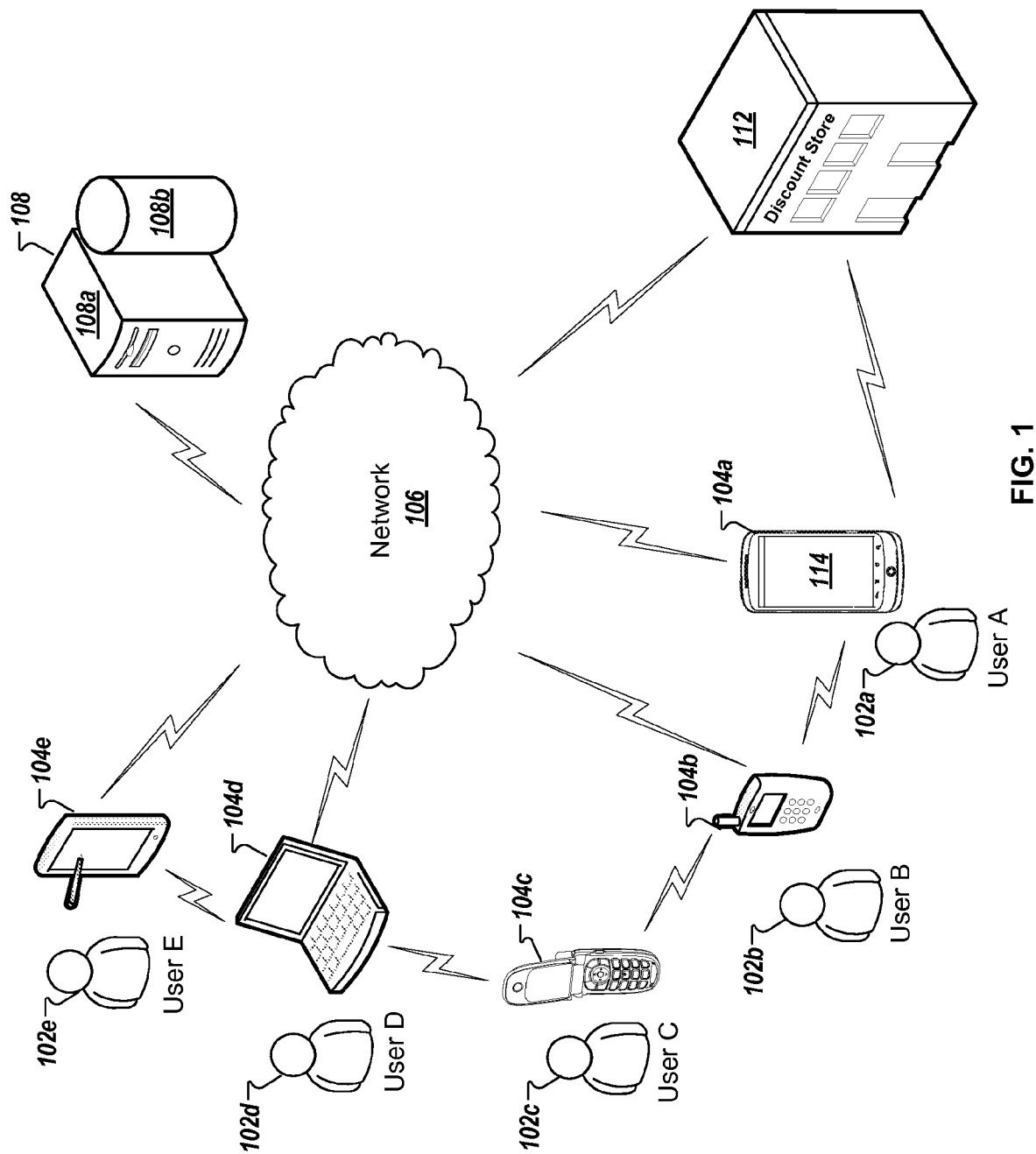
FIG. 1 is a diagram that shows a plurality of users using a variety of computing devices that communicate via a network to a server where each of the computing devices can determine proximity of other computing devices or proximity of physical locations.

FIG. 1 is a block diagram that shows a plurality of users 102a-e using a variety of computing devices 104a-e, respectively, where each of the computing devices 104a-e can determine proximity of other computing devices or proximity of physical locations. In some cases, the other computing devices 104a-e can be mobile computing devices used by a user. In some cases, the user may also be mobile (e.g., in a moving vehicle, walking, running) when using the computing device. In other cases, the other computing devices 104a-e may be part of or otherwise included in a mobile entity such as a vehicle. In some implementations, each computing device 104a-e can use a wireless communication system and protocol for short-range communication (e.g., communicating with one or more proximate computing devices). In addition, each computing device 104a-e can use a wireless and/or wired communication system and protocol for long-range communications (e.g., communicating over network 106 with a computer system 108). The computer system 108 can include one or more computing devices (e.g., server 108a) and one or more computer-readable storage devices (e.g., database 108b).

In some implementations, the computing devices 104a-e can be laptop or desktop computers, smartphones, personal digital assistants, portable media players, tablet computers, or other appropriate computing devices that can communicate, using the network 106, with other computing devices or computer systems. In some implementations, the computing devices 104a-e can perform client-side operations, as discussed in further detail herein. In some implementations, the computer system 108 can represent more than one computing device working together to perform server-side operations. In some implementations, the network 106 can be a public communications network (e.g., the Internet, cellular data network, dialup modems over a telephone network) or a private communications network (e.g., private LAN, leased lines). In some implementations, the computing devices 104a-e can communicate with the network 106 using one or more high-speed wired and/or wireless communications protocols (e.g., 802.11 variations, WiFi, Bluetooth, TCP/IP, Ethernet, IEEE 802.3, etc.).

For example, referring to FIG. 1, a computing device 104b can communicate using a wireless and/or wired communication system and protocol for long-range communications with the network 106. For example, the network 106 can be a cellular network that includes multiple cell sites where each site may have a maximum range of up to approximately one-half mile (1600 meters). In some situations, each site may have a maximum range of up to approximately five miles (8000 meters). The computing devices 104a-e can communicate wirelessly with the network 106.

In addition, the computing device 104b can communicate wirelessly, using a wireless communication system and protocol for short-range communication, with computing device 104a. For example, the computing device 104a and the computing device 104b can establish near field communications (NFC) when the computing device 104a and the computing device 104b are within centimeters or are in contact with one another. In this example, the computing device 104a and the computing device 104b include the hardware and software needed to implement NFC. The use of NFC can enable the establishment of short-range (e.g., having a maximum range of less than about four centimeters) communications between the computing device 104a and the computing device 104b. In some cases, the maximum range of the short-range communications between two NFC enabled computing devices may be greater than four centimeters. In some cases, the maximum range of the short-range communications between two NFC enabled computing devices may be less than four centimeters. On average, however, two NFC enabled computing devices can communicate with one another when they are located less than about four centimeters from each other.

In another example, the computing device 104a and the computing device 104b can use wireless local area network (WLAN) communication technology standards (e.g., IEEE 802.11 based standards) to communicate with one another. The use of WLAN communication technology standards can enable the establishment of secure short-range (e.g., having a maximum range of less than about 70 meters) communications between the computing device 104a and the computing device 104b. In some cases, the maximum range of the short-range communications between two WLAN enabled computing devices may be greater than 70 meters. In some cases, the maximum range of the short-range communications between two WLAN enabled computing devices may be less than 70 meters. On average, however, two WLAN enabled computing devices can communicate with one another when they are located less than about 70 meters from each other.

In another example, the computing device 104a and the computing device 104b can use the Classic Bluetooth wireless technology standard to communicate with one another. The use of Classic Bluetooth can enable the establishment of secure short-range (e.g., having a maximum range of less than about 100 meters) communications between the computing device 104a and the computing device 104b. In some cases, the maximum range of the short-range communications between two Classic Bluetooth enabled computing devices may be greater than 100 meters. In some cases, the maximum range of the short-range communications between two Classic Bluetooth enabled computing devices may be less than 100 meters. On average, however, two Classic Bluetooth enabled computing devices can communicate with one another when they are located less than about 100 meters from each other.

In another example, Bluetooth Low Energy (Bluetooth LE) can enable the establishment of secure short-range (e.g., having a maximum range of less than about 50 meters) communications between the computing device 104a and the computing device 104b. In some cases, the maximum range of the short-range communications between two Bluetooth LE enabled computing devices may be greater than 50 meters. In some cases, the maximum range of the short-range communications between two Bluetooth LE enabled computing devices may be less than 50 meters. On average, however, two Bluetooth LE enabled computing devices can communicate with one another when they are located less than about 50 meters from each other.

A computing device using Bluetooth LE can consume less power than a computing device using Bluetooth or other types of wireless communication systems and protocols. It may be advantageous, therefore, when a computing device's power may be limited (e.g., it operates on a battery) to use Bluetooth LE. In cases where a Bluetooth LE enabled computing device may be frequently "searching" for other Bluetooth LE enabled devices (e.g., the Bluetooth LE capability of the computing device is always on or active), power consumption can be an issue in order for the frequent searching to not drain the battery of the computing device.

Referring to FIG. 1, the computing devices 104a-e can be configured to communicate using a wireless and/or wired communication system and protocol for long-range communications with the network 106. In addition or in the alternative, the computing devices 104a-e can be configured to communicate wirelessly, using a wireless communication system and protocol for short-range communication, with one or more other computing devices (e.g., computing devices 104a-e can communicate with one another). The users 102a-e of the computing devices 104a-e, respectively, can enable or disable the short-range communication capabilities of the respective computing devices 104a-e.

For example, the computing device 104b can "discover" the computing device 104a when the computing device 104a is within the range (e.g., 50 meters) of the short-range communication system utilized by both the computing device 104a and the computing device 104b. Once discovered, the computing device 104a can provide information to and/or exchange information with the computing device 104b. The information can be based on the context of the computing device 104a and the computing device 104b (e.g., the location of the computing devices 104a-b) along with information about each of the computing devices 104a-b (e.g., the user 102a owns the computing device 104a and the user 102b owns the computing device 104b).

A user can allow (consent to) short-range communications between a computing device it owns and/or operates and another computing device owned and/or operated by another user. Referring to FIG. 1, the user 102a can allow short-range communications between the computing device 104a and the computing device 104b that is owned and/or operated by the user 102b. For example, the user 102a of computing device 104a can indicate on the computing device 104a that the computing device 104a can perform an action on the computing device 104a when it is in proximity to the computing device 104b of the user 102b. The computing device 104a, using the network 106, can communicate the indication of the action to the computer system 108. The server 108a can store the indication of the action in the database 108b. In addition, the computer system 108 can communicate with the computing device 104b, using the network 106, informing the computing device 104b that the user 102a of the computing device 104a is interested in communicating with the user 102b of the computing device 104b when the user 102a and the user 102b are in proximity to one another (the computing device 104a and the computing device 104b are in proximity to each other). If the user 102b allows (consents to) short-range communications between the computing device 104b and the computing device 104a, then the computing device 104b can communicate back to the computer system 108, using the network 106, that the computing device 104b will allow short-range communications with the computing device 104a.

The computer system 108 can generate a unique identifier associated with the indication of the action provided to the computer system 108 by the computing device 104a. The computer system 108 can communicate, using the network 106, with the computing device 104a and the computing device 104b and provide each computing device 104a-b with the identifier. As such, the computing device 104a and the computing device 104b know the unique identifier for the indicated action that the computing device 104a can perform when it is in proximity to the computing device 104b (the user 102a is in proximity to the user 102b). The computing device 104b can then "broadcast", using a protocol for the wireless short-range communication system it is configured to use, the unique identifier. The computing device 104*a* can "listen", using a protocol for the wireless short-range communication system it is configured to use (which is the same wireless short-range communication system the computing device 104*b* is configured to use), for the unique identifier.

When computing device 104*b* is in proximity to the computing device 104*a* (user 102*b* is in proximity to user 102*b*), the computing device 104*b* and the computing device 104*a* can "wake up" (e.g., transition out of a sleep or reduced power mode) and proceed to "recognize" each other (e.g., the computing devices 104*a-b* communicate with one another using the wireless short-range communication system). The computing device 104*a* acknowledges that a unique identifier received from computing device 104*b* is the same as a unique identifier known by the computing device 104*a*. Based on this acknowledgement, the computing device 104*a* performs the action associated with the unique identifier.

The above example describes short-range communications between the computing device 104*a* and computing device 104*b*. Short-range communications, however, can also be established among any of the computing devices 104*a-e* in a similar manner.

In some implementations, a user (e.g., user 102*a*) may own and/or operate multiple computing devices (e.g., the computing device 104*a* and the computing device 104*d*) that may share information with one another and/or be synchronized to one another. For example, referring to FIG. 1, user 102*a* and user 102*d* may be the same user. The user 102*a*, using the computing device 104*d*, can indicate on the computing device 104*d* that the computing device 104*a* can perform an action on the computing device 104*a* when it is in proximity to the computing device 104*b* of the user 102*b*. In addition or in the alternative, the user 102*a*, using the computing device 104*d*, can indicate on the computing device 104*d* that either or both of the computing devices 104*d* and 104*a* can perform an action on each respective computing device 104*d* and 104*a* when either or both of the computing devices 104*d* and 104*a* are in proximity to the computing device 104*b* of the user 102*b*.

Referring to FIG. 1, each of the computing devices 104*a-e* can be considered a type of entity where each of the computing devices 104*a-e* can be configured to communicate wirelessly, using a wireless communication system and protocol for short-range communication, with one another. In addition or in the alternative, the computing devices 104*a-e* can be configured to communicate wirelessly, using a wireless communication system and protocol for short-range communication, with an additional entity, entity 112. For example, an entity 112 and a computing device 104*b* can "discover" each other when the computing device 104*b* is within the range (e.g., 50 meters) of a short-range communication system utilized by both the computing device 104*b* and the entity 112. Once discovered, the entity 112 can provide information to and/or exchange information with the computing device 104*b*.

The information can be based on user-related data such as preferences, reminders, and/or other types of data associated with the user 102*b*. In addition or in the alternative, the information can be based on the context (e.g., location and time) of the computing device 104*b* of the user 102*b* and the entity 112 when the short-range communication between the computing device 104*b* and the entity 112 is established. The computing device 104*b* can provide the user-related data to the computer system 108 for storage in the database 108*b* (e.g., in a user table) in association with the computing device 104*b* for the user 102*b* for possible future access by one or more entities. The user-related data and the computing device 104*b* can each be associated with a unique user identification code for the user 102*b* that is maintained by the computer system 108. In addition, the database 108*b* can store information related to and associated with the entity 112 (e.g., in an entity table).

When the computing device 104*b* is in proximity to the entity 112 (the computing device 104*b* is within the range (e.g., 50 meters) of the short-range communication system utilized by both the computing device 104*b* and the entity 112), the entity 112 can "recognize" the computing device 104*b*. For example, the user 102*b* with the computing device 104*b* may enter a building for the entity 112, or the user 102*b* with the computing device 104*b* may be proximate to a specific location for the entity 112. Using a short-range communication system and protocol, the computing device 104*b* can broadcast the unique user identification code associated with the computing device 104*b*. The entity 112, when the computing device 104*b* is within the range of the short-range communication system, can receive the unique identification code for the computing device 104*b*. The entity 112 can communicate with the computer system 108, using the network 106, in order to provide the computer system 108 with the received broadcasted unique user identification code associated with the computing device 104*b*. The computer system 108 can determine one or more common interests between user-related data and entity-related data. For example, the computer system 108 can determine similar and/or common entries in a user-related data table and an entity-related data table. In another example, the computer system 108 can use interest graphs for the user-related data and the entity-related data in order to determine one or more common interests between the user 102*b* and the entity 112.

The entity 112 can provide information to the computing device 104*b* related to the determined common data between the user-related data and the entity-related data and the context (e.g., location and time) of the computing device 104*b* of the user 102*b* and the context of the entity 112 when the computing device 104*b* is proximate to the entity 112. The computing device 104*b* can provide the information to the user 102*b*, for example, by displaying a message on a display portion 114 of the computing device 104*b*. In some cases, when the user 102*b* receives the message, the user 102*b* can indicate that they accept the information provided by the entity 112. In some cases, when the computing device 104*b* displays the message (and, in particular, if this is the first time the computing device 104*b* has received communications of any sort from the entity 112 on the computing device 104*b*), the user 102*b* can decide not to allow the entity 112 to provide information to the computing device 104*b*. For example, the computing device 104*b* can provide an indication to the entity 112 to not allow any communications with the entity 112 when the computing device 104*b* receives a selection of an associated option in a user interface displayed on the display portion 114 of the computing device 104*b*.

In some implementations, a computing device (e.g., one of the computing devices 104*a-e*) and an entity are configured to communicate with one another using a short-range communication system and protocol. In addition, however, the computing device and the entity may not be capable of long-range communications with a network (e.g., the network 106). The entity and the computing device may be at a location that does not allow or is unable to provide long-range communications with a network.

In these implementations, the entity and the computing device can "discover" each other when the computing device is within the range (e.g., 50 meters) of a short-range communication system utilized by both the computing device and the entity. Once discovered, the entity can provide information to and/or exchange information with the computing device, the information based on the context (e.g., location and time) of the entity and the computing device.

When the computing device is in proximity to the entity (the computing device is within the range (e.g., 50 meters) of the short-range communication system utilized by both the computing device and the entity), the entity can "recognize" the computing device and provide context-relevant information to the computing device. The computing device can provide the information to a user (e.g., user 102b) of the computing device (e.g., computing device 104b), for example, by displaying a message on a display portion (e.g., display portion 114) of the computing device (e.g., computing device 104b).

In some cases, when the user receives a particular message from the entity, the user can indicate that they consent to receiving further information related to the entity at a time in the future when the user may no longer be in proximity to the entity. The computing device can save (store locally on the computing device) an indication of the consent to receive further communications related to the entity. At a time in the future when the computing device (e.g., computing device 104b) can access a network (e.g., network 106), the computing device, using the network, can communicate the indication of the action to a computer system (e.g., computer system 108). A server (e.g., server 108a) included in the computer system can store the indication of the consent to receive further communications related to the entity in a database (e.g., database 108b), associating the database entry with a unique user identification code for the user of the computing device. In addition, or in the alternative, the computer system can inform a server hosted by the entity that the user of the computing device, identified by the unique user identification code, consented to receive further communications related to the entity.

At a time in the future, and/or at a predetermined time interval that begins in the future (e.g., weekly, monthly, every Friday afternoon), the server hosted by the entity can send a communication (e.g., Short Message Service (SMS) message, electronic mail (email) message, etc.) to the computing device of the user using long-range communications with a network. The sending of the communication to the user by the server hosted by the entity can be based on a unique user identification code for the computing device of the user and the past indication by the user consenting to the receipt of further communications related to the entity. In this case, the previously identified proximity of the computing device of the user to the entity can result in the computing device of the user receiving future communications from a server hosted by the entity. The received future communications can provide information to the computing device of the user related to the entity even if the user (and the computing device of the user) is not proximate to the entity at the time when the computing device of the user receives the communications.

Figure 2A:
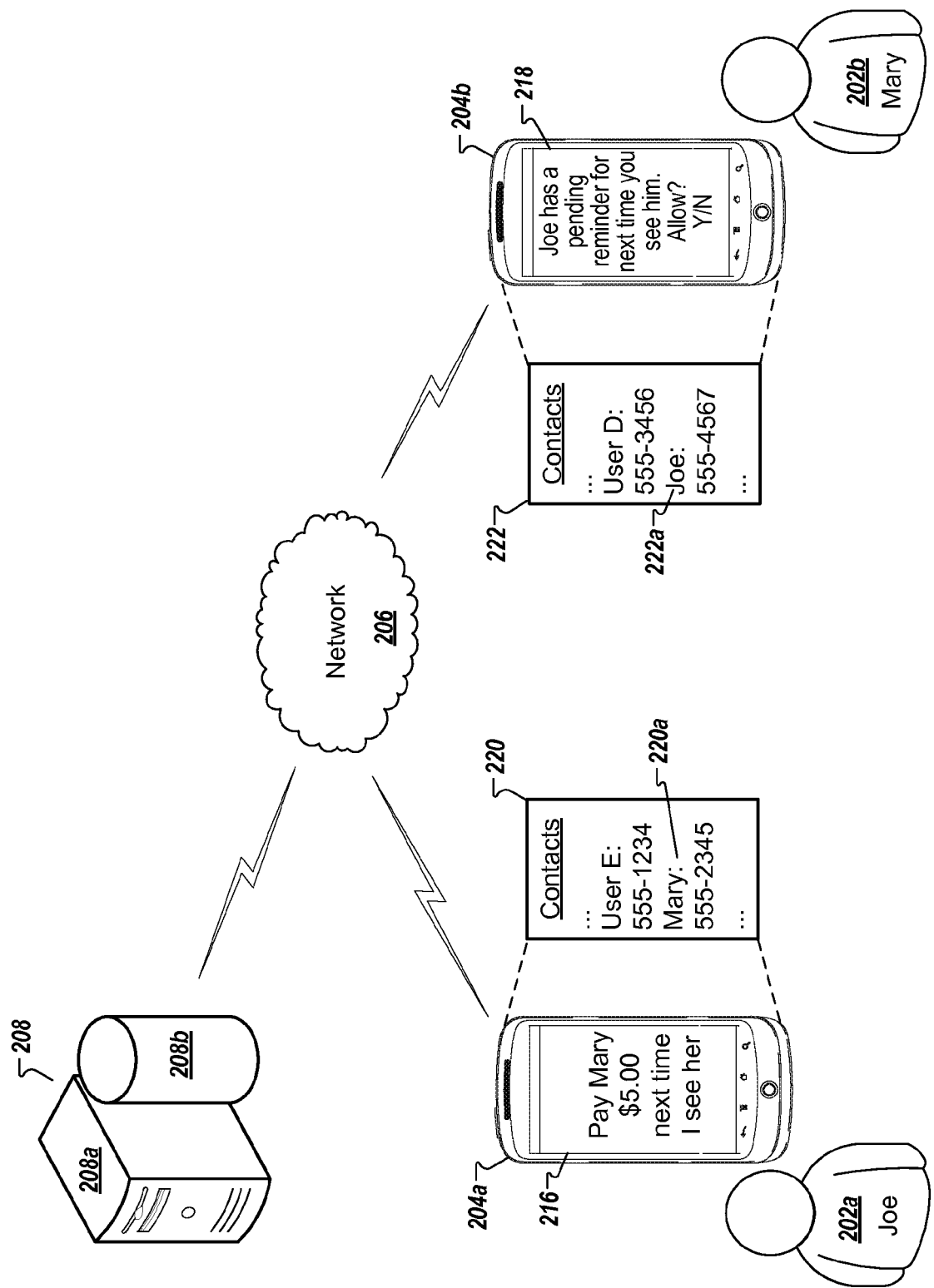
FIG. 2A and FIG. 2B are diagrams illustrating an example implementation of a proximity reminder provided to a computing device.
Figure 2B:
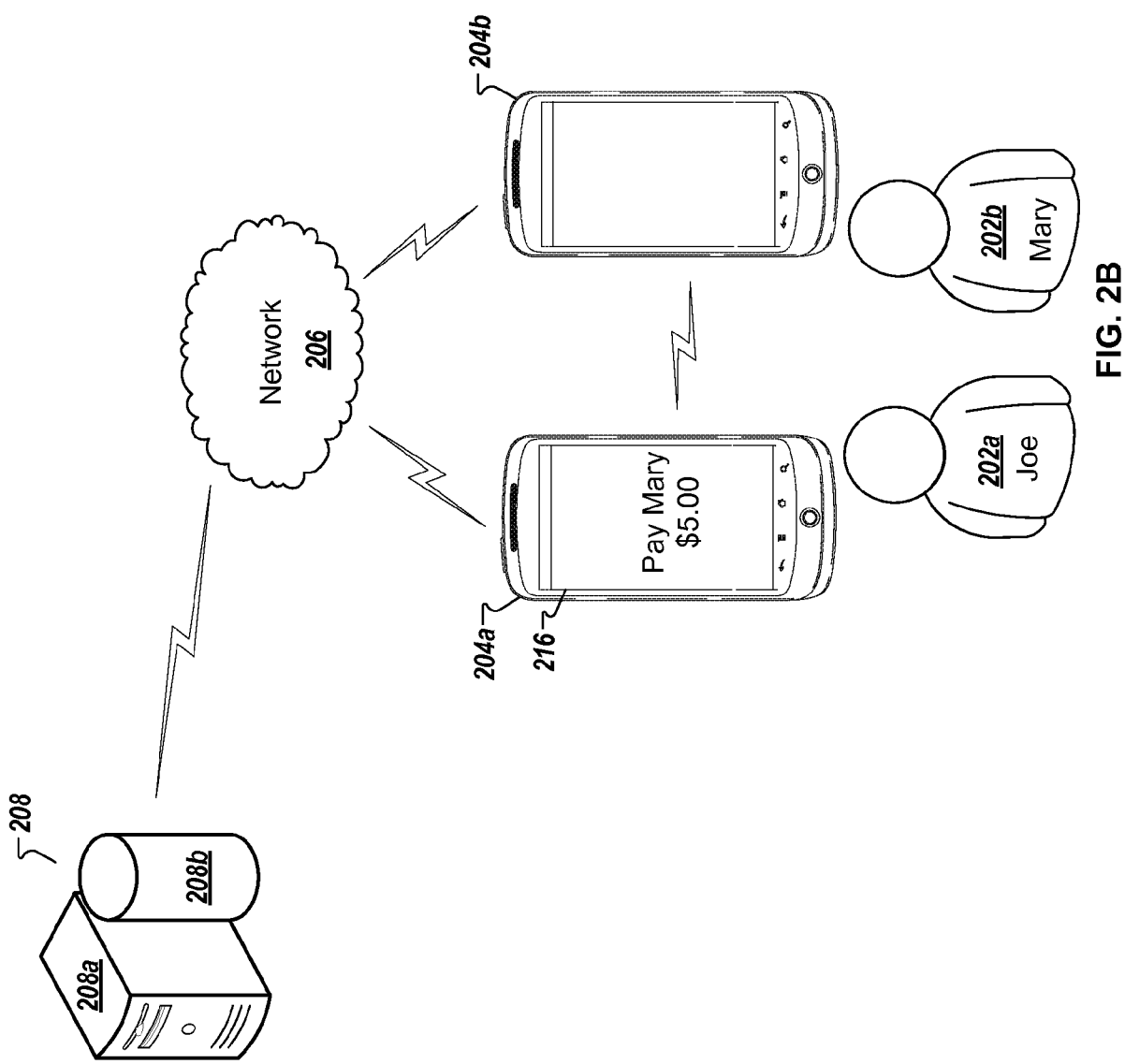

FIGS. 2A-B are diagrams illustrating an example implementation of a proximity reminder provided to a computing device 204a. The computing devices 204a and a computing device 204b can be configured to communicate using a wireless and/or wired communication system and protocol for long-range communications with the network 206. In addition or in the alternative, the computing device 204a and the computing device 204b can be configured to communicate wirelessly, using a wireless communication system and protocol for short-range communication, with one another.

Referring to FIG. 2A, a user 202a (Joe) can set a reminder on the computing device 204a to "pay Mary $5.00 next time I see her." The user 202a is associated with the computing device 204a (e.g., the user 202a owns the computing device 204a). A user 202b (Mary) is associated with the computing device 204b (e.g., the user 202b owns the computing device 204b). In another example, a service provider may register a user to a computing device though another user may actually own the computing device. In this case, the registered user is the user associated with the computing device.

The setting of the reminder indicates that when the computing device 204a (and the user 202a) is determined to be proximate to the computing device 204b (and user 202b) that the reminder be displayed on a display portion 216 of the computing device 204a reminding user 202a (Joe) that he needs to pay user 202b (Mary) five dollars. The computing device 204a can identify contact or other information for the user 202b in order to identify the user 202b. For example, the computing device 204a can determine contact information for the user 202b from contact information stored in a contacts list 220 on the computing device 204a. In some cases, the contact list for the user 202a may be stored in a database 208b of the computer system 208. In another example, a social networking service used by the user 202a can provide the contact information for the user 202b. In some cases, the social networking service can store the contact information locally on the computing device 204a. In some cases, the social networking service can store the contact information for the user 202a in a database 208b of the computer system 208.

The computing device 204a, using the network 206, can communicate a request to the computer system 208 to create a pending reminder for user 202a that is based on a detected proximity of the computing device 204b of the user 202b (a proximity-based reminder). The computer system 208 can communicate with the computing device 204b by way of network 206 to inform the computing device 204b that the user 202a of the computing device 204a has set a proximity-based reminder. For example, the computing device 204b can display a message to the user 202b on a display portion 218 of the computing device 204b indicating the user 202a (Joe) has set a pending proximity-based reminder.

The user 202b can decide to allow (consent to) or not allow (not consent to) the proximity-based reminder alerting the computing device 204a of the user 202a when the computing device 204b of the user 202b is proximate to the computing device 204a. In some cases, the decision of the user 202b can be for all proximity-based communications between the computing device 204a and the computing device 204b. In other cases, the decision of the user 202b can be for a single, one-time proximity-based communication between the computing device 204a and the computing device 204b. In these other cases, the user 202b may be prompted to allow or not allow a proximity-based communication each time such a communication could occur between the computing device 204a and the computing device 204b.

In one example, the computer system 208 receives from the computing device 204b, using the network 206, the decision of the user 202b to not allow proximity-based communications with computing device 204a and user 202a. The computer system 208 can send a message to the computing device 204a using the network 206. The computing device 204a can display in the display portion 216 of the computing device 204a to the user 202a the message indicating that the computing device 204b of the user 202b does not wish to partake in proximity-based communications with the computing device 204a of the user 202a.

In another example, the computer system 208 receives from the computing device 204b the decision of the user 202b to allow proximity-based communications with computing device 204a and user 202a. The server 208a can generate a proximity reminder identifier associated with the proximity-based reminder received from the computing device 204a. The server 208a can store, in the database 208b, the proximity reminder identifier with the proximity-based reminder in association with the computing device 204a and the user 202a. The computer system 208, using the network 206, can send the proximity reminder identifier to both the computing device 204a and the computing device 204b. The computing device 204b, using short-range communications (e.g., using Bluetooth LE), broadcasts the proximity reminder identifier. In addition, the computing device 204a, using short-range communications (e.g., using Bluetooth LE), listens for broadcasts. When the computing device 204a is determined to be in proximity to the computing device 204b (e.g., the computing device 204a and the computing device 204b are within the range of the short-range communication system (e.g., the computing device 204a and the computing device 204b are within 50 meters of each other)), both the computing device 204a and the computing device 204b will "wake up" (e.g., the computing device 204a "hears" the broadcast of the proximity reminder identifier from the computing device 204b).

Referring to FIG. 2B, the computing device 204a confirms with the computing device 204b that the computing device 204a has received the broadcasted proximity reminder identifier and is the targeted recipient of the proximity reminder identifier. The computing device 204a and the computing device 204b acknowledge that they are in possession of the same proximity reminder identifier. Based on the confirmation and acknowledgement, the computing device 204a displays a reminder to the user 202a (Joe) on the display portion 216 of the computing device 204a to "pay Mary $5.00."

In the cases where the user 202b decides to allow (consents to) all proximity-based communications between the computing device 204a and the computing device 204b, the user 202b can also have the option of changing the decision at any time to not allow (not consent to) all proximity-based communications between the computing device 204a and the computing device 204b. For example, the computing device 204b can provide a user interface that can be accessed by the user 202b to allow the user 202b to indicate that they want to not allow further proximity-based communications between the computing device 204a and the computing device 204b.

In another example, referring to FIGS. 2A-B, the user 202a and the user 202b may share common interests. Data related to the interests for the user 202a and data related to the interests for the user 202b can be stored in the database 208b in association with each user 202a-b and each computing device 204a-b, respectively. In some implementations, an association can be made between the user 202a and the user 202b based on each user's contact information being included in the other user's contact list. For example, an entry 220a for the user 202b is in the contact list 220 stored on the computing device 204a, and an entry 222a for the user 202a is in a contact list 222 stored on the computing device 204b. Based on the association of the users 202a-b, the computer system 208 can determine one or more common interests between the users 202a-b. For example, the computer system 208 can form a shared interest graph by comparing the data related to the interests of user 202a with the data related to the interests of user 202b. The computer system 208 can determine that shared data between the data related to the interests of the user 202a and the data related to the interests of the user 202b is the viewing Tom Cruise movies. The computer system 208 can determine, using the data related to the interests of the user 202a, that user 202a recently purchased movie tickets on-line for a Tom Cruise movie. The computer system 208 can determine, using the data related to the interests of the user 202b, that the user 202b recently rented on-line a Tom Cruise movie.

Also, as described, the computing device 204a and the computing device 204b are capable of short-range communications (e.g., each computing device 204a-b is a Bluetooth LE enabled computing device). Each computing device 204a-b can broadcast an identifier associated with the respective computing device that the other computing device can receive and acknowledge, enabling communication between the computing devices 204a-b, where the communication is indicative of a determined proximity of the computing device 204b to the computing device 204a.

For example, the user 202a and the user 202b may each make use of an intelligent personal assistant hosted on their respective computing devices 204a-b. Each computing device 204a-b can receive the data related to the common interests of the user 202a and the user 202b in the form of an electronic card sent by the computer system 208 to each of the computing devices 204a-b. The computing device 204a can present to the user 202a information relevant to the data related to the common interests of the user 202a and the user 202b. The user 202a can access the intelligent personal assistant on the computing device 204a when in determined proximity to the computing device 204b for the user 202b, in order for the user 202a to determine what movies may be playing at the local movie theatres. The computing device 204a can present the user 202a with an electronic card showing times for a Tom Cruise movie at a local movie theater based on the common interest in Tom Cruise movies shared by the user 202a of the computing device 204a and the user 202b of the proximate computing device 204b.

Figure 3A:
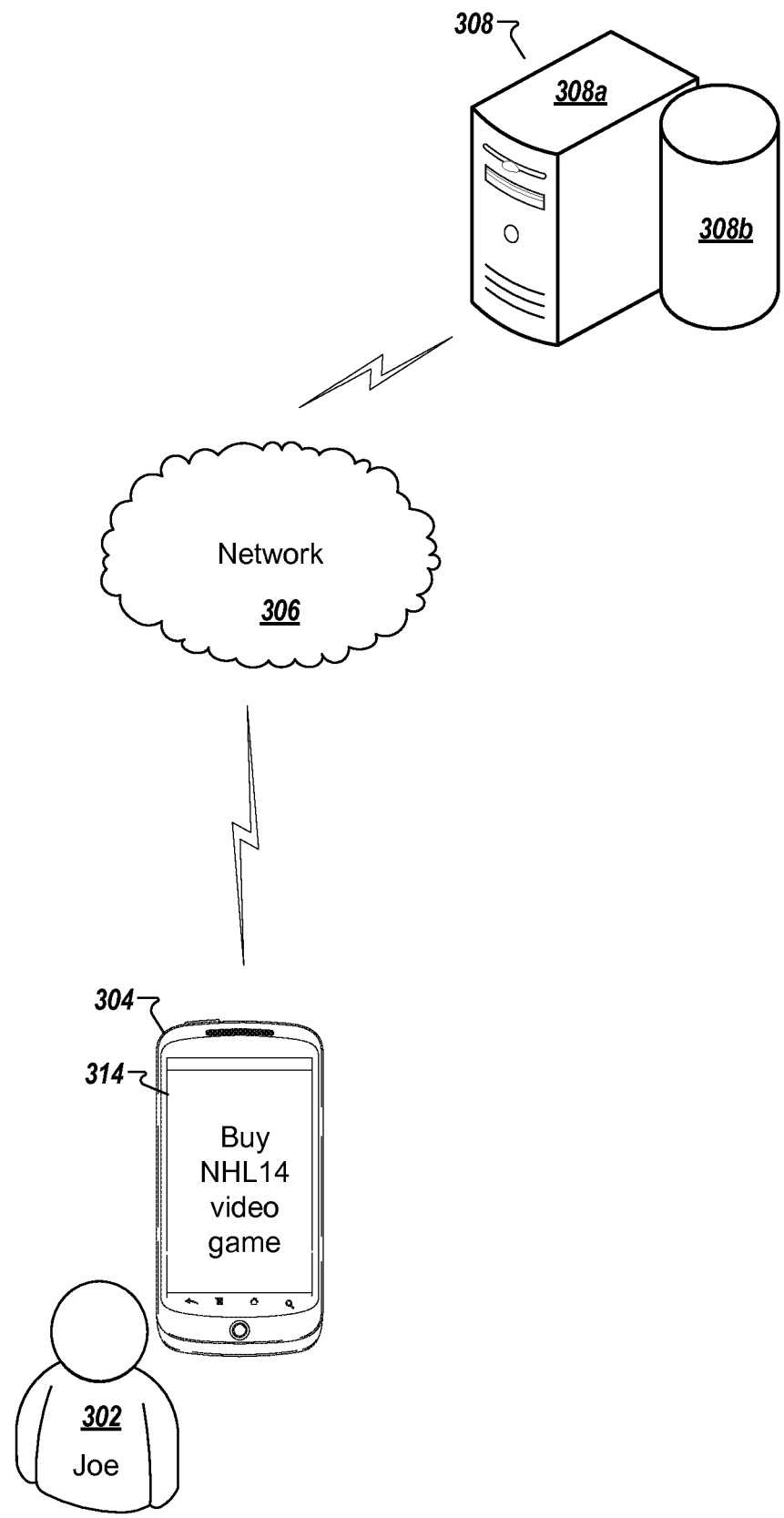
FIG. 3A and FIG. 3B are diagrams illustrating an example implementation of proximity relevant information provided to a computing device.
Figure 3B:
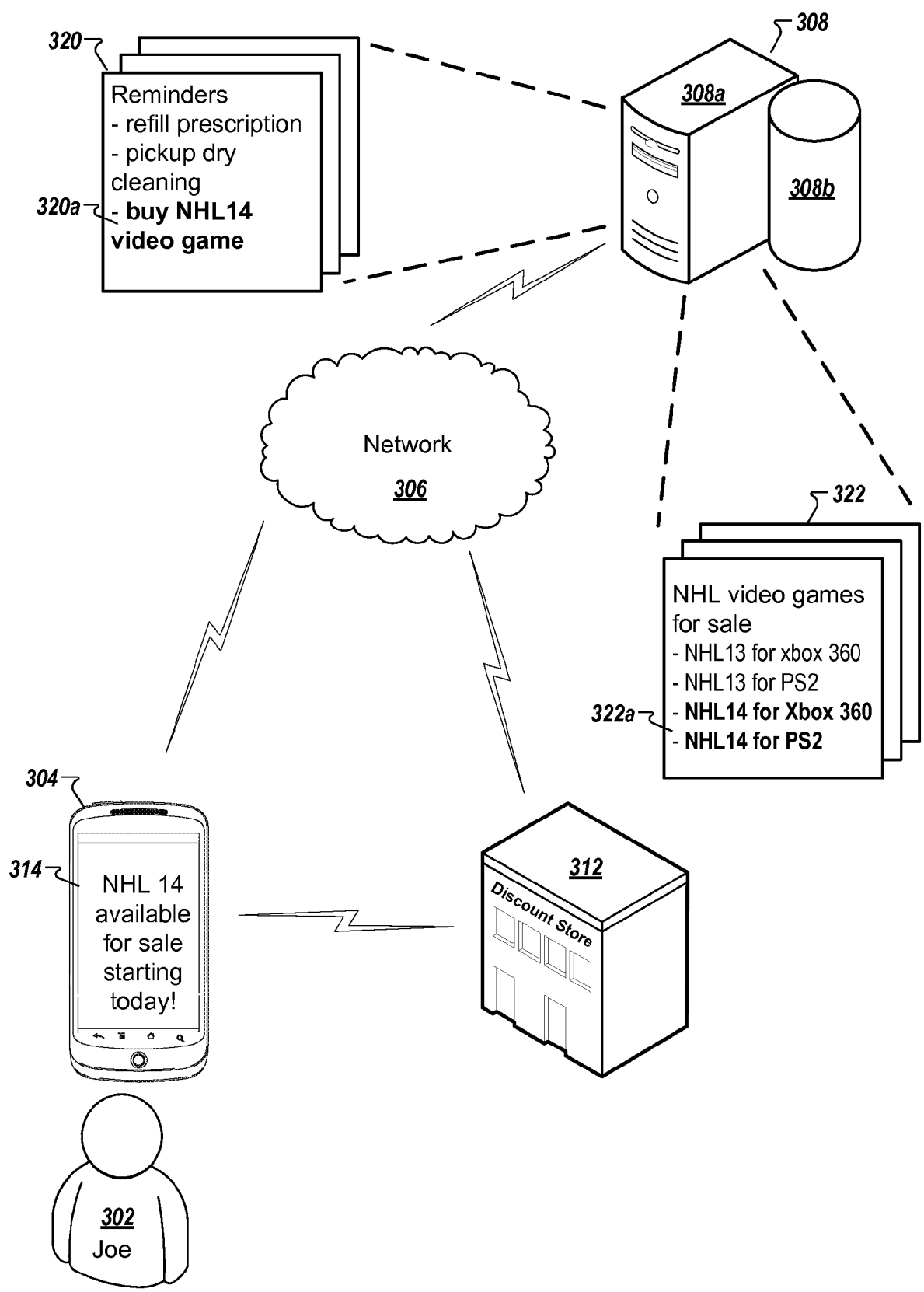

FIGS. 3A-B are diagrams illustrating an example implementation of proximity relevant information provided to a computing device 304. The computing device 304 can be configured to communicate using a wireless and/or wired communication system and protocol for long-range communications with the network 306.

Referring to FIG. 3A, a user 302 (Joe) can set a reminder on the computing device 304 to "Buy NHL14 video game." The user 302 is associated with the computing device 304. For example, the user 302 can own the computing device 304 or the computing device 304 can be registered to the user 302. The setting of the reminder indicates that when the computing device 304 (and the user 302) is determined to be proximate to an entity that may sell the NHL14 video game, the reminder can be displayed on a display portion 314 of the computing device 304 reminding the user 302 (Joe) to buy the NHL14 video game. The computing device 304, using the network 306, can communicate a request to the computer system 308 to create a reminder 320a for the user 302 to buy the NHL14 video game for sale. In addition, the computer system 308 can associate a proximity reminder identifier with the reminder 320a. The computer system 308 can store the reminder 320a and its associated identifier in a table or list of reminders 320 associated with the user 302 and the computing device 304. The reminders 320 can be stored in the database 308b. In addition, the computer system 308 can store other information and data about the interests of the user 302 in association with the computing device 304. The additional information and data can be stored in the database 308b.

Referring to FIG. 3B, the computing device 304 and entity 312 are capable of short-range communications (e.g., the computing device 304 is a Bluetooth LE enabled computing device and the entity 312 includes one or more Bluetooth LE enabled beacons). The computing device 304 can broadcast an identifier associated with the computing device 304 that the one or more beacons included in the entity 312 can receive, enabling bi-directional short-range communications between the computing device 304 and each of the one or more beacons included in the entity 312.

The computing device 304, using short-range communications (e.g., using Bluetooth LE), broadcasts the identifier associated with the computing device 304. The one or more beacons included in the entity 312 use short-range communication systems and protocols (e.g., Bluetooth LE) to "listen" for broadcasts from short-range communication (e.g., Bluetooth LE) enabled computing devices. The computing device 304 is determined to be in proximity to a beacon included in the entity 312 (e.g., the computing device 304 is in proximity to the entity 312) when the computing device 304 and the beacon included in the entity 312 are within the range of the short-range communication system (e.g., the computing device 304 and the beacon included in the entity 312 are within 50 meters of one another)).

When the proximity of the computing device 304 to the beacon included in the entity 312 is determined, the entity 312 may further communicate with the computer system 308 using the network 306 to determine if there are any shared interests between the entity 312 and the user 302 based on the received identifier associated with the computing device 304. For example, the server 308a can access information for the entity 312 related to the interests of the entity 312 (e.g., entity data 322 stored in the database 308b). In addition, the server 308a can access information associated with the computing device 304 related to interests of the user 302 (e.g., the reminders 320 stored in the database 308b). For example, the computer system 308 can generate a shared interest graph by comparing the information associated with the computing device 304 and related to interests of the user 302 (e.g., the reminders 320) with the interests of the entity 312, stored as entity data 322. The computer system 308 can determine that the computing device 304 has a reminder 320a set to buy the NHL14 video game and the entity 312 (based on the entity data 322) has the NHL14 video game currently available for sale.

Based on determining the shared interest of the user 302 and the entity 312 (e.g., the reminder 320a related to the purchase of the NHL14 video game and the entity data 322 indicating that the entity 312 is currently selling the NHL14 video game), the entity 312, using the short-range communications, can send an indication to the computing device 304 that the entity 312 has the NHL14 video game currently available for sale. The computing device 304 can display the indication that the entity 312 has the NHL14 video game currently available for sale to the user 302 by displaying a message on a display portion 314 of the computing device 304.

In some implementations, the user 302 can choose to ignore any communications received from the entity 312. The user 302 can make the choice when the computing device 304 receives a first communication from the entity 312. The user 302 can make the choice on a one-time basis (ignore a single communication) for each received communication. In addition or in the alternative, the user 302 can make the choice on a semi-permanent basis, allowing the user 302 to choose to ignore all communications received from the entity 312 by the computing device 304 when the computing device 304 receives a communication from the entity 312, but also allowing the user 302 to alter the choice later, at a time when no communication is received from the entity.

In another example, when the proximity of the computing device 304 to the beacon included in the entity 312 is determined, the entity 312 communicates with the computer system 308, using the network 306, to determine if there are any shared interests between the entity 312 and the user 302. The computer system 308 can determine one or more shared interests between the entity 312 and the user 302 based on the identifier received from and associated with the computing device 304. The computer system 308 can determine a shared interest of the user 302 and the entity 312 based on records of previous purchases made by the user 302 and stored in a records database for the user 302 that can be included in the database 208b. The user 302 may have recently purchased tickets on an on-line ticket-purchasing website to see a Star Wars movie in a theater. The server 308a can access information for the entity 312 related to the interests of the entity 312 (e.g., entity data 322 stored in the database 308b). The computer system 308 can determine that the computing device 304 of the user 302 was used to purchase tickets on an on-line ticket-purchasing website to see a Star Wars movie and the entity 312 (based on the entity data 322) currently has the Star Wars Trilogy collection available for sale on DVD and BluRay. Based on determining the shared interest of the user 302 and the entity 312 (e.g., Star Wars movies), the entity 312, using the short-range communications, can send an indication to the computing device 304 regarding the promotion about the entity 312 having the Star Wars Trilogy collection available for sale on DVD and BluRay. The computing device 304 can display the promotion to the user 302 by displaying a message on a display portion 314 of the computing device 304.

In all cases, a user (e.g., user 302) can set one or more options or controls on the computing device (e.g., the computing device 304) of the user that can block and/or not allow the computing device to broadcast or otherwise provide an identifier associated with the computing device to other computer systems or other computing devices that may communicate with, using either short-range or long-range communications, the computing device of the user. In these cases, the user may not experience proximity-based reminders or other types of proximity based interactions as described herein.

FIGS. 4A-B are diagrams illustrating an example implementation of the use of past proximity data of a computing device 404 when providing future relevant information to the computing device 404. Referring to FIG. 4A, a Bluetooth LE enabled computing device 404 and a Bluetooth LE enabled beacon 430a included in an entity 430 are capable of short-range communications. The computing device 404 can broadcast an identifier associated with the computing device 404 that the Bluetooth LE enabled beacon 430a can receive, enabling bi-directional communication between the computing device 404 and the Bluetooth LE enabled beacon 430a. In the example of FIG. 4A, the computing device 404 and the entity 430 may not use a wireless and/or wired communication system and protocol for long-range communications with a network. For example, the entity 430 and the computing device 404 may be located in a geographical location where there is no network service (e.g., the top of a mountain at a ski resort).

The Bluetooth LE enabled beacon 430a included in the entity 430 broadcasts information associated with the entity 430. The computing device 404, using Bluetooth LE that is enabled on the computing device 404, "listens" for broadcasts from other Bluetooth LE enabled beacons and computing devices.

When the computing device 404 determines that it is in proximity to the Bluetooth LE enabled beacon 430a included in the entity 430 (e.g., the computing device 404 is located within the short-range communication range of the Bluetooth LE enabled beacon 430a (e.g., the computing device 404 is within 50 meters of the Bluetooth LE enabled beacon 430a)), the computing device 404 can receive the broadcasted information from Bluetooth LE enabled beacon 430a. The computing device 404 can display the received broadcasted information to a user 402 (Joe) on a display portion 414 of the computing device 404. For example, Joe may be waiting in a lift line at a ski resort, where the location of the computing device 404 and the entity 430 preclude long-range communications with a network. The computing device 404 can receive lift line wait times from a Bluetooth LE enabled beacon 430a when the computing device 404 is proximate to the Bluetooth LE enabled beacon 430a. The computing device 404 can display the lift line wait times to the user 402 on the display portion 414 of the computing device 404.

The ability of the computing device 404 and the Bluetooth LE enabled beacon 430a of the entity 430 to establish short-range communications can result in providing the user 402 with proximity-based context information. The computing device 404 can receive information for display to the user 402 on the display portion 414 of the computing device 404 that is related to the current location and time of day of the computing device 404 of the user 402.

In addition, once short-range communications are established between the Bluetooth LE enabled beacon 430a and the computing device 404, the Bluetooth LE enabled beacon 430a can send a message to the computing device 404 for display to the user 402 (Joe) on the display portion 414 of the computing device 404. The message can request if the user 402 would like to allow the receipt of future communications related to the entity 430. In some cases, the user 402 may allow (consent to) receiving future communications related to the entity 430. The consent to receive further communications related to the entity 430 can be stored locally on the computing device 404 for further upload to a computer system 408 when the computing device 404 of the user 402 can establish long-range communications with the computer system 408. In some cases, the user 402 may not allow (not consent to) receiving future communications related to the entity 430. The refusal to receive future communications from the entity 430 may also be stored locally on the computing device 404.

Referring to FIG. 4B, the user 402 can be located at a geographical location where wireless and/or wired communication systems and protocols for long-range communications with a network 406 are enabled. For example, the computing device 404 is now located outside of the ski resort in a geographical location (e.g., the home of the user 402) where network service is available. When the computing device 404 determines that it can communicate with the network 406, the computing device 404 can send to the computer system 408 using the network 406 the consent to receive future communications related to the entity 430. A server 408a can store the consent in the database 408b in association with the computing device 404 for the user 402 and in association with the entity 430.

Referring to FIG. 4C, the entity 430 can host a computer system 440 (e.g., server 440a and database 440b) that can provide communications (e.g., Short Message Service (SMS) messages, electronic mail (email) messages, etc.) related to the entity 430 to computing devices using the network 406. The computer system 440 can identify computing devices whose users have indicated and/or enabled such communications between the computer system 440 and the computing devices. For example, the computer system 440 can communicate with the computer system 408 to determine that the computing device 404 will allow receipt of communications from the entity 430.

Figure 5:
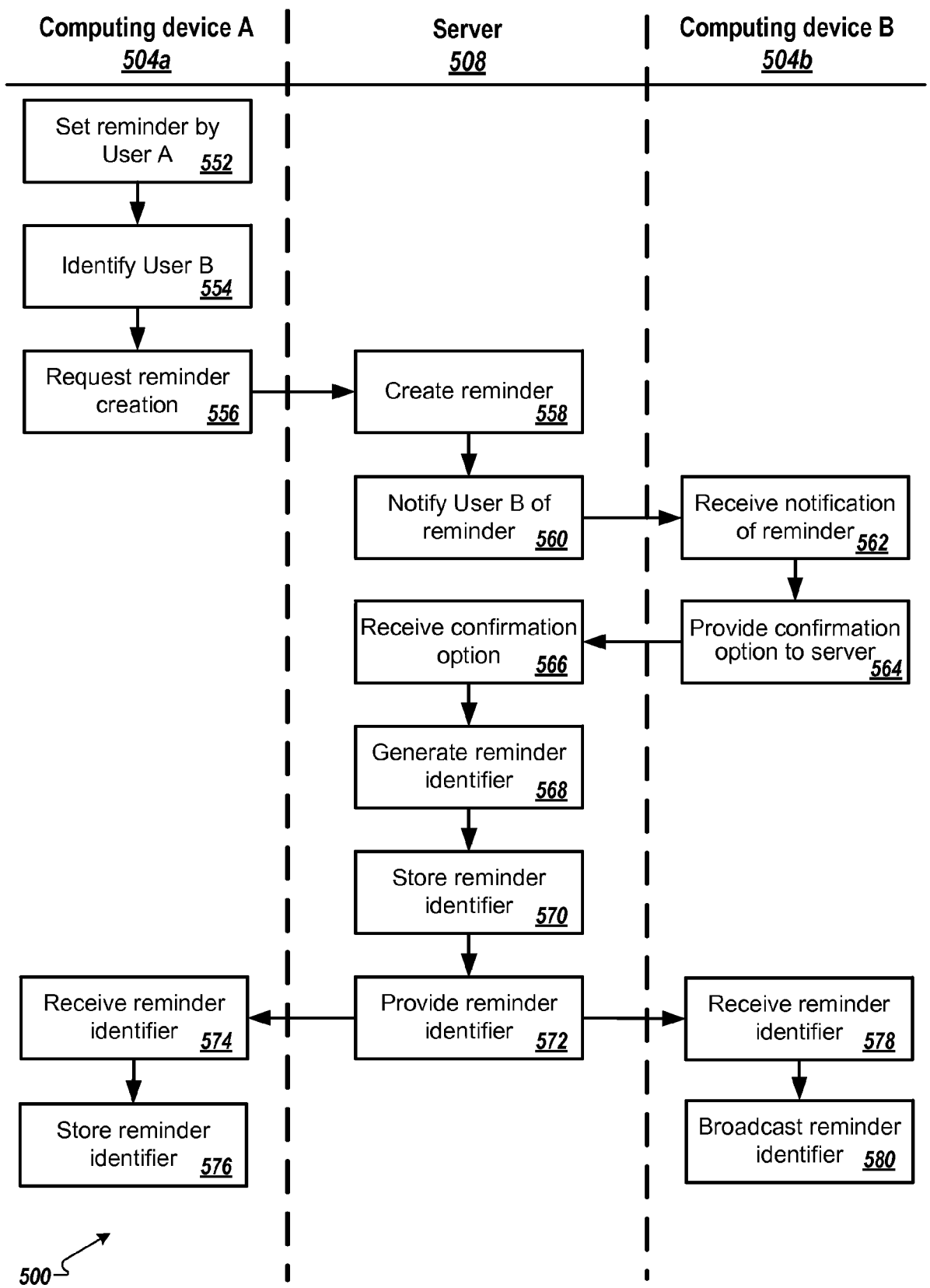
FIG. 5 is a swim lane diagram illustrating an example process for implementing a proximity reminder.

At a time when the computing device 404 of the user 402 is not in proximity to the entity 430, and/or at a predetermined time interval (e.g., weekly, monthly, every Friday afternoon), the computer system 440 can send a communication (e.g., Short Message Service (SMS) message, electronic mail (email) message, etc.) to the computing device 404 of the user 402 using the network 406. The sending of the communication to the user by the computer system 440 can be based on a unique user identification code for the computing device 404 of the user 402 and the past indication and/or enablement of the receipt of further communications by the computing device 404 that are related to the entity 430. In this case, the previously identified proximity of the computing device 404 of the user 402 to the entity 430 can result in the computing device 404 of the user 402 receiving information related to the entity 430 even if the user 402 (and the computing device 404) is not proximate to the entity 430 at the time when the computing device 404 of the user 402 receives the communications FIG. 5 is a swimlane diagram illustrating an example process 500 for implementing a proximity reminder. The process 500 can be executed by the described systems and computing devices described with reference to FIGS. 1, 2A-B, 3A-B, and 4A-C.

In the example process 500, a device 504a and a device 504b can communicate with a server 508. The device 504a, the device 504b, and the server 508 can use a wireless and/or wired communication system and protocol for long-range communications with a network accessible by the device 504a, the device 504b, and the server 508.

A reminder can be set by a user (user A) of a computing device 504a (device A) (block 552). A user (user B) associated with the reminder can be identified (block 554). For example, the user A can set a reminder on the computing device 504a to perform a particular action on the computing device 504a when the computing device 504a is in proximity to a computing device 504b of the user B. The computing device 504a can determine the identity of the user B (e.g., determine contact information for the computing device 504b of the user B that may be stored locally on the computing device 504a). A request to create the reminder is sent by the computing device 504a to the server 508 (block 556). The request can include the particular action the computing device 504a will perform when the computing device 504a is determined to be in proximity to the computing device 504b of the user B along with the determined contact information for the computing device 504b of the user B.

The reminder is created (block 558). Once the reminder is created, a notification regarding the creation of the reminder is sent by the server 508 to the computing device 504b (block 560). The computing device 504b receives the notification regarding the reminder (block 562). For example, the computing device 504b of a user B can receive a message for display on a display portion of the computing device 504b. The message can inform user B that user A wishes to establish short-range communications between the computing device 504a of user A and the computing device 504b of user B when the computing device 504a is in proximity to the computing device 504b.

A confirmation option is sent to the server 508 by the computing device 504b (block 564). For example, the user B allows (consents to) the establishing of short-range communication between the computing device 504a of user A and the computing device 504b of user B. The server 508 receives the confirmation option from the computing device 504b (block 566). Based on receiving a confirmation to establish short-range communications between the computing device 504a of user A and the computing device 504b of user B, the server 508 generates a reminder identifier (block 568). The reminder identifier is associated with the reminder created by the server 508 and stored by the server 508 (block 570). For example, the server 508 can store reminders for the user A (and associated identifiers for the reminders) in a database accessible by the server 508.

The server 508 sends the reminder identifier to the computing device 504a (block 572). The computing device 504a receives the reminder identifier (block 574). The computing device 504a stores the reminder identifier locally on the computing device 504a (block 576). The computing device 504a can use the stored reminder identifier to confirm short-range communications with a computing device (e.g., the computing device 504b) that broadcasts the same reminder identifier.

The server 508 also sends the reminder identifier to the computing device 504b (block 572). The computing device 504a receives the reminder identifier (block 578). The computing device 504a broadcasts the reminder identifier (block 574). The computing device 504a can broadcast the reminder identifier using a short-range communication system and protocol that can be also used by the computing device 504a.

Figure 6:
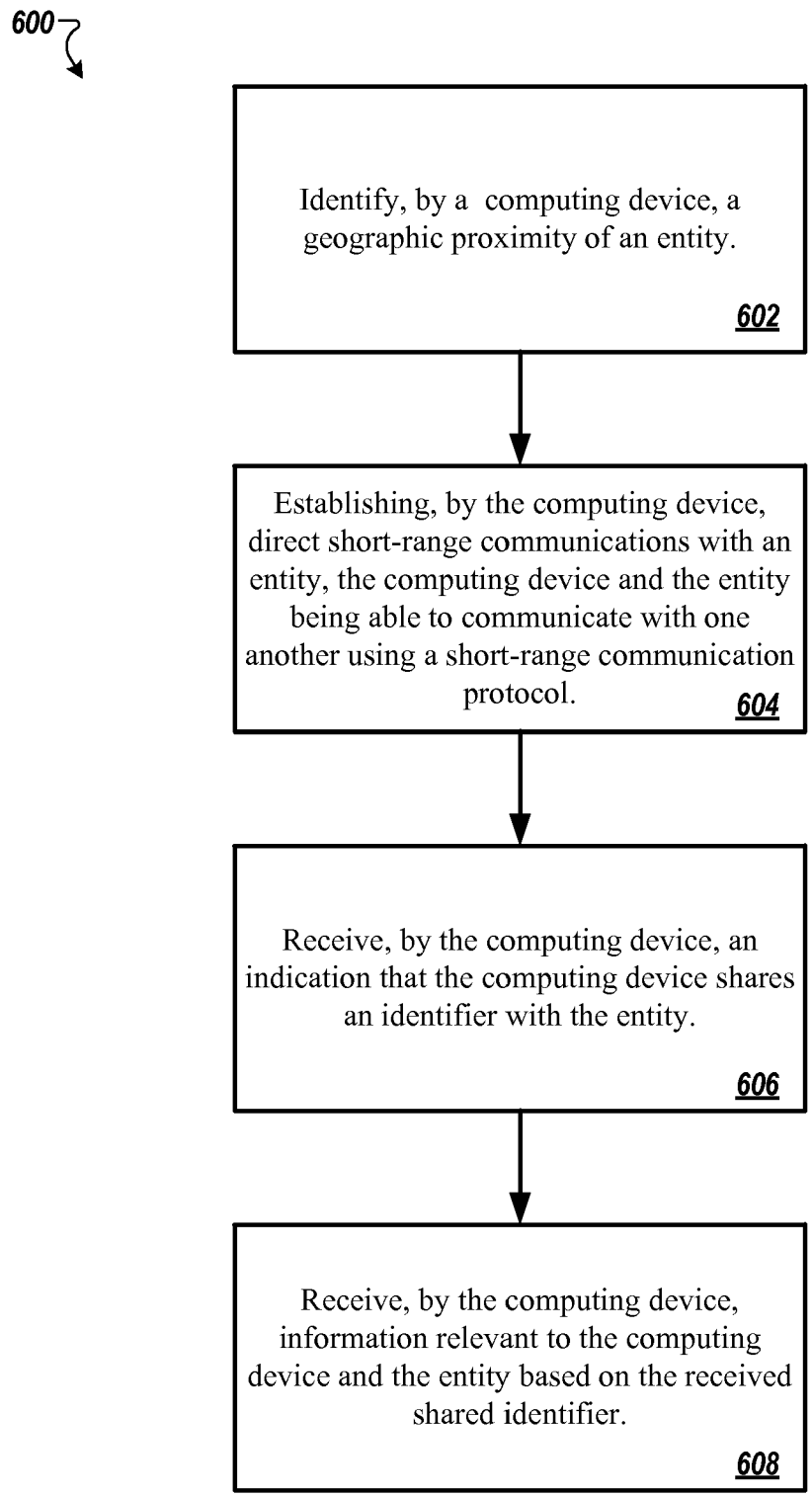
FIG. 6 is a flowchart that illustrates a method for providing relevant information to a computing device based on proximity to an entity.

FIG. 6 is a flowchart that illustrates a method 600 for providing relevant information to a computing device based on proximity to an entity. In some implementations, the method 600 can be implemented by the computer systems and computing devices described herein. For example, the method 600 can be implemented by the computer systems and computing devices discussed with reference to FIG. 1.

The method 600 begins by identifying, by a computing device, a geographic proximity of an entity (block 602). The computing device establishes direct short-range communications with the entity, the computing device and the entity being able to communicate with one another using a short-range communication protocol (block 604). For example, the computing device 104b and the entity 112 can each be enabled to communicate using a protocol whose maximum range is less than one hundred meters (e.g., the computing device 104b is Bluetooth LE enabled and the entity 112 includes a Bluetooth LE enabled beacon). The computing device 104b can determine when it is in proximity to the entity 112 when short-range communications (using a protocol whose maximum range is less than one hundred meters) are established between the computing device 104b and the Bluetooth LE enabled beacon included in the entity 112.

In another example, the computing device 104b and the computing device 104a can each be enabled to communicate using a protocol whose maximum range is less than one hundred meters (e.g., the computing device 104b and the computing device 104a are each Bluetooth LE enabled). The computing device 104b can determine when it is in proximity to the computing device 104a when short-range communications (using a protocol whose maximum range is less than one hundred meters) are established between the computing device 104b and the computing device 104a.

The computing device can receive an indication that the computing device shares an identifier with the entity (block 606). For example, the Bluetooth LE enabled beacon included in the entity 112 can receive a unique identification code associated with the computing device 104b from the computing device 104b. The entity 112 can provide the unique identification code to the computer system 108. The computer system 108 can determine a shared identifier based on interest data associated with the computing device 104b that is in common with interest data associated with the entity.

In another example, the computing device 104a can receive an identifier associated with the computing device 104b from the computer system 108. The computing device 104a can broadcast the received identifier, which the computing device 104b can be receive and recognize.

The computing device can receive information relevant to the computing device and the entity based on the received shared identifier (block 608). For example, the computing device 104b can receive information related to the availability for sale by the entity 112 of a product based on a reminder set by the user of the computing device 104b to purchase the product.

In another example, the computing device 104b can receive a reminder to pay money owed to the user 102a of the computing device 104a based on an identifier for a reminder shared by the computing device 104a and the computing device 104b.

Figure 7:
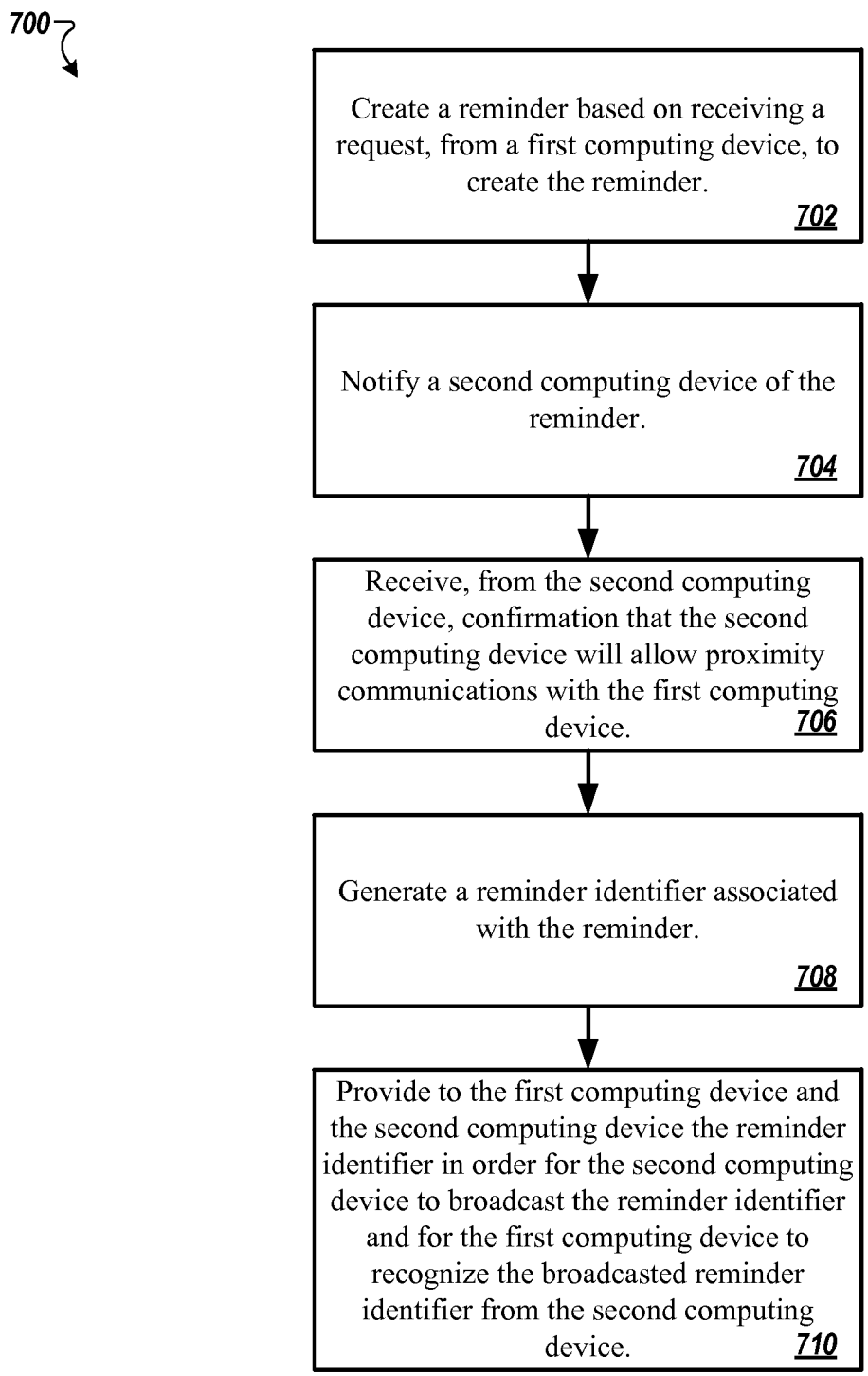
FIG. 7 is a flowchart that illustrates a method of determining and providing a proximity reminder.

FIG. 7 is a flowchart that illustrates a method 700 of determining and providing a proximity reminder. In some implementations, the method 700 can be implemented by the computer systems and computing devices described herein. For example, the method 700 can be implemented by the computer systems and computing devices discussed with reference to FIG. 1.

The method 700 begins by creating a reminder based on receiving a request, from a first computing device, to create the reminder (block 702). For example, the computer system 108 receives a request from the computing device 104b to create a reminder to write a check for the rent when the computing device 104b (the user 102b) is in proximity to the computing device 104a (the user 102a).

A second computing device is notified of the reminder (block 704). For example, the computer system 108 notifies the computing device 104a that the computing device 104b has created a proximity reminder associated with the computing device 104a (and the user 102a). A confirmation that the second computing device will allow proximity communications with the first computing device is received from the second computing device (block 706). For example, the computing device 104a allows (consents to) short-range communications with the computing device 104b. The computing device 104a provides the confirmation to the computer system 108.

A reminder identifier associated with the reminder is generated (block 708). For example, the computer system 108 generates a reminder identifier and associates the reminder identifier with the reminder and the computing device 104*b* of the user 102*b*.

The reminder identifier is provided to the first computing device and the second computing device in order for the second computing device to broadcast the reminder identifier and for the first computing device to recognize the broadcasted reminder identifier from the second computing device (block 710). For example, the computer system 108 provides the reminder identifier to the computing device 104*a* and the computing device 104*b*. The computing device 104*a* broadcasts the reminder identifier using a short-range communication system and protocol. The computing device 104*b*, enabled to use the same short-range communication system and protocol used by the computing device 104*a*, receives and recognizes the broadcasted reminder identifier when the computing device 104*b* is in proximity to the computing device 104*a*.

Figure 8:
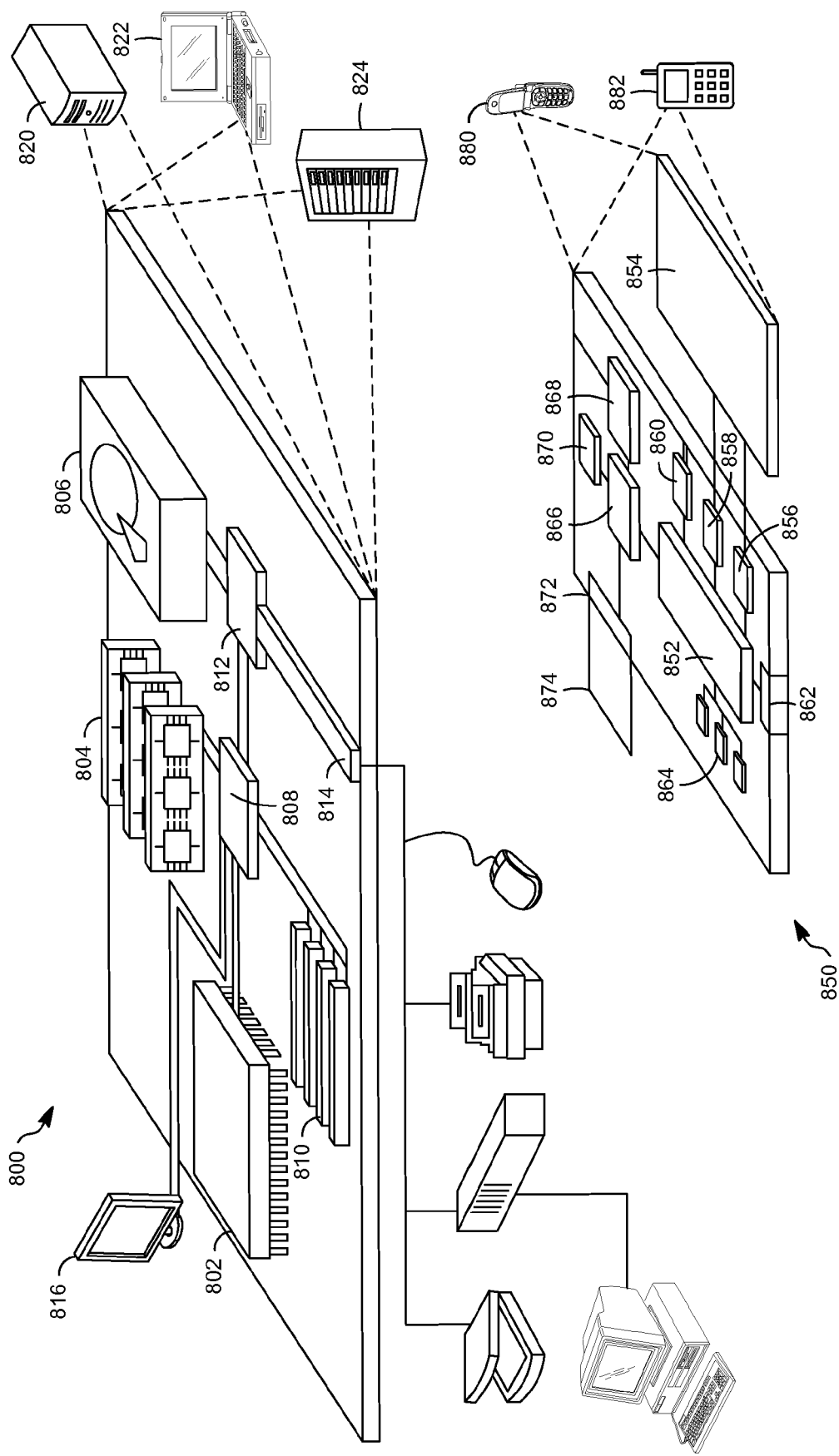
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Bluetooth LE, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Bluetooth LE, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    determining, at a first computing device, that a user, via interaction with the first computing device, set a proximity-based reminder;
    in response to determining that the user set the proximity-based reminder:
        providing, to a second computing device, an indication of the proximity-based reminder, wherein providing the indication of the proximity-based reminder to the second computing device causes the second computing device to, when in short-range communication with the first computing device:
            determine whether information, available at the second computing device, is relevant to the proximity-based reminder, and
            provide, to the first computing device, any information determined by the second computing device to be relevant to the proximity-based reminder;
        subsequent to providing the indication of the proximity-based reminder to the second computing device:
            receiving, at the first computing device and via short-range communication established with the second computing device, particular information from the second computing device, wherein the particular information is available at the second computing device and is provided based on the second computing device determining that the particular information is relevant to the proximity-based reminder; and
            based on receiving the particular information:
                causing rendering, at the first computing device, of the particular information.

2. The method of claim 1, wherein the second computing device is part of a vehicle.

3. The method of claim 2, further comprising:
    determining, at the first computing device, contact information for the second computing device;
    wherein providing, to the second computing device, the indication of the proximity-based reminder comprises using the contact information for the second computing device in providing, to the second computing device, the indication of the proximity-based reminder.

4. The method of claim 3, wherein causing rendering, at the first computing device, of the particular information, comprises causing display of the particular information at a display portion of the first computing device.

5. The method of claim 4, wherein the indication of the proximity-based reminder includes a shared identifier, and wherein the particular information is determined, by the second computing device, to be relevant to the proximity-based reminder by using the shared identifier.

6. The method of claim 5, wherein the shared identifier includes a common interest between the first computing device and an entity associated with the second computing device.

7. The method of claim 6, wherein the short-range communication established with the second computing device is via a Bluetooth protocol.

8. The method of claim 1, further comprising:
    determining, at the first computing device, contact information for the second computing device;
    wherein providing, to the second computing device, the indication of the proximity-based reminder comprises using the contact information for the second computing device in providing, to the second computing device, the indication of the proximity-based reminder.

9. The method of claim 1, wherein causing rendering, at the first computing device, of the particular information, comprises causing display of the particular information at a display portion of the first computing device.

10. The method of claim 1, wherein the indication of the proximity-based reminder includes a shared identifier, and wherein the particular information is determined, by the second computing device, to be relevant to the proximity-based reminder by using the shared identifier.

11. A computing device comprising:
    a display portion;
    a short-range communication transceiver;
    one or more processors; and
    memory configured to store instructions that, when executed by the one or more processors, cause the one or more processors to perform operations that include:
        in response to determining that a user set a proximity-based reminder at the computing device:
            providing, to a second computing device, an indication of the proximity-based reminder, wherein providing the indication of the proximity-based reminder to the second computing device causes the second computing device to, when in short-range communication with the computing device via the short-range communication transceiver of the computing device:
                determine whether information, available at the second computing device, is relevant to the proximity-based reminder, and
                provide, to the computing device, any information determined by the second computing device to be relevant to the proximity-based reminder;
            subsequent to providing the indication of the proximity-based reminder to the second computing device:
                receiving, via short-range communication established with the second computing device via the short-range communication transceiver, particular information from the second computing device, wherein the particular information is available at the second computing device and is provided based on the second computing device determining that the particular information is relevant to the proximity-based reminder; and based on receiving the particular information:
                    causing rendering of the particular information.

12. The computing device of claim 11, wherein the second computing device is part of a vehicle.

13. The computing device of claim 12, wherein the operations further include:
    determining contact information for the second computing device;

wherein providing, to the second computing device, the indication of the proximity-based reminder comprises using the contact information for the second computing device in providing, to the second computing device, the indication of the proximity-based reminder.

14. The computing device of claim 13, wherein the indication of the proximity-based reminder includes a shared identifier, and wherein the particular information is determined, by the second computing device, to be relevant to the proximity-based reminder by using the shared identifier.

15. The computing device of claim 13, wherein causing rendering of the particular information comprises causing display of the particular information at the display portion.

16. The computing device of claim 11, wherein the indication of the proximity-based reminder includes a shared identifier, and wherein the particular information is determined, by the second computing device, to be relevant to the proximity-based reminder by using the shared identifier.

17. The computing device of claim 16, wherein the shared identifier includes a common interest between the computing device and an entity associated with the second computing device.

18. The computing device of claim 11, wherein the short-range communication established with the second computing device is via a Bluetooth protocol.

19. The computing device of claim 18, wherein the Bluetooth protocol is Bluetooth low energy.

* * * * *